(12) United States Patent
Rust

(10) Patent No.: US 6,834,531 B2
(45) Date of Patent: Dec. 28, 2004

(54) GAS CHROMATOGRAPH MODULAR AUXILIARY OVEN ASSEMBLY AND METHOD FOR ANALYZING A REFINERY GAS

(76) Inventor: Christopher J. Rust, 21610 Plank Rd., Zachary, LA (US) 70791

( * ) Notice: Subject to any disclaimer, the term of this patent is extended or adjusted under 35 U.S.C. 154(b) by 0 days.

(21) Appl. No.: 10/035,796

(22) Filed: Dec. 31, 2001

(65) Prior Publication Data

US 2002/0170904 A1 Nov. 21, 2002

Related U.S. Application Data

(60) Provisional application No. 60/259,147, filed on Dec. 29, 2000.

(51) Int. Cl.[7] .................. G01N 30/00; G01N 30/30; G01N 30/54; F27D 11/00
(52) U.S. Cl. .................. 73/23.41; 73/23.35; 73/23.42; 95/82; 95/87; 96/101; 96/104; 422/89; 219/385; 219/391
(58) Field of Search .............. 73/23.35, 23.4, 73/23.41, 23.42; 95/82, 86, 87; 96/101, 104; 422/89; 219/385, 391

(56) References Cited

U.S. PATENT DOCUMENTS

| | | | |
|---|---|---|---|
| 3,069,894 A | * 12/1962 | Claudy | ............. 73/23.42 |
| 4,470,832 A | 9/1984 | Sugawara et al. | |
| 4,553,985 A | * 11/1985 | Dahlgren et al. | ............ 73/23.42 |
| 5,049,509 A | * 9/1991 | Szakasits et al. | ............ 73/23.38 |
| 5,071,547 A | * 12/1991 | Cazer et al. | .................. 96/104 |
| 5,338,514 A | * 8/1994 | Morabito et al. | ............ 73/23.42 |
| 5,340,543 A | 8/1994 | Annino et al. | |
| 5,435,169 A | * 7/1995 | Mitra | ........................ 73/23.41 |
| 5,447,556 A | * 9/1995 | Pleil et al. | ...................... 95/87 |
| 6,004,514 A | * 12/1999 | Hikosaka et al. | ............. 422/89 |
| 6,227,034 B1 | * 5/2001 | Trochesset | ................ 73/23.42 |
| 6,365,105 B1 | * 4/2002 | Waters et al. | ............... 73/23.42 |
| 6,453,725 B1 | * 9/2002 | Dahlgren et al. | ........... 73/23.42 |
| 6,474,136 B1 | * 11/2002 | Nishina et al. | ............. 73/23.42 |

FOREIGN PATENT DOCUMENTS

| | | | | |
|---|---|---|---|---|
| GB | 1089642 | * 11/1967 | ................ 73/23.42 |
| JP | 5-87793 | * 4/1993 | ................ 73/23.3 |
| JP | 5-126812 | * 5/1993 | ................ 73/23.22 |

* cited by examiner

Primary Examiner—Daniel S. Larkin
(74) Attorney, Agent, or Firm—Henry E. Naylor

(57) ABSTRACT

An auxiliary modular oven assembly for use with a gas chromatograph. The auxiliary oven assembly is comprised of a housing, an oven compartment, a heater, at least one sampling valve, at least one fixed volume sample loop, and at least one chromatograph column or column trains, wherein the column or column trains contains a material capable of causing the separation of chemical components of a chemical sample at elevated temperatures.

5 Claims, 1 Drawing Sheet

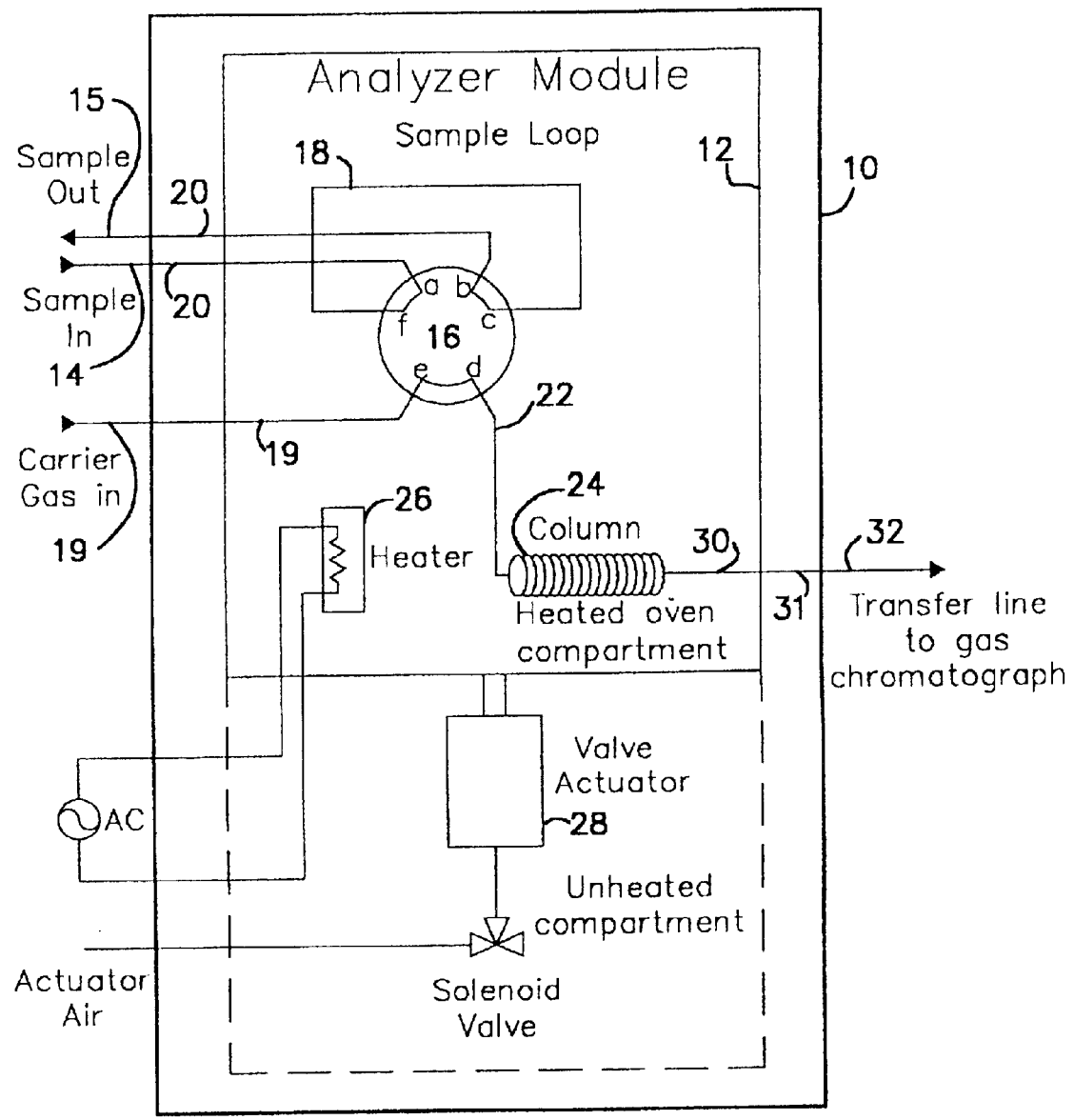

GAS CHROMATOGRAPH MODULAR AUXILIARY OVEN ASSEMBLY AND METHOD FOR ANALYZING A REFINERY GAS

CROSS-REFERENCE TO RELATED APPLICATIONS

This application claims benefit of Provisional Application 60/259,147 filed Dec. 29, 2000.

FIELD OF THE INVENTION

The present invention relates to an auxiliary modular oven assembly for use with a gas chromatograph. The auxiliary oven assembly is comprised of a housing, an oven compartment, a heater, at least one sampling valve, at least one fixed volume sample loop, and at least one chromatograph column or column trains, wherein the column or column trains contains a material capable of causing the separation of chemical components of a chemical sample at elevated temperatures.

BACKGROUND OF THE INVENTION

Refinery and chemical plant product streams are often analyzed by gas chromatography to determine what chemical components are present and their concentrations. It is often important that the analysis be performed as quickly as possible to give the operator of a process unit feedback as to the product state being produced. The longer the process unit is producing an off-spec product slate, the more money is lost.

Chromatography is a well known analytical tool. Chromatography involves the separation of a mixture of chemical compounds (solutes) into separate components. It is easier to identify (qualitate) and measure the amount (quantitate) of the various sample components by separating the sample into individual components. There are numerous chromatographic techniques and corresponding instruments. Gas chromatography is the chromatography of interest in the practice of the present invention. To be suitable for gas chromatographic analysis, a compound must have sufficient volatility with thermal stability. If all, or some of, the chemical components are in the gas or vapor phase at 400–450° C. or below, and they do not decompose at these temperatures, the components can most likely be analyzed by gas chromatography.

A typical gas chromatography system is comprised of an oven in which is located a column containing a packing material (stationary phase) capable of causing the separation of the chemical components of the chemical stream to be analyzed when the stream is vaporized; and at least one detector capable of detecting the individual vaporized chemical components of the sample stream. The oven is typically programmable to a temperature range that will vaporize the components of the sample stream to be analyzed. In gas chromatography, the chemical stream to be analyzed is injected into a sampling valve that directs it to a fixed volume loop wherein it is swept into a carrier gas then through a chromatograph column or column train that is maintained at suitable temperatures for separation of chemical components of the sample stream. The chemical components take different times to travel the length of the column. Components having more affinity for the packing material in the column will tend to be retained in the packing, and their migration through the column will take a longer time. A detector determines the type and concentration of each chemical component that is separated in the column.

The current state of gas chromatography art can be divided into several categories. A first category includes methods that use a conventional gas chromatograph as a platform. These instruments use conventional packed columns (⅛" ID), having a relatively large bore, and standard two position rotary chromatography valves. Such instruments typically require from about 15 to 65 minutes to complete a refinery gas analysis. Analysis speed is typically restricted by the speed of the valves, system dead volume, column flow rates, column efficiency, and oven temperature programming limits. The majority of conventional gas chromatograph systems in use today fall within this category.

A second category of gas chromatograph systems uses a conventional gas chromatograph as a platform but employs fast switching diaphragm valves, micro-bore capillary columns and micro-packed columns to accomplish the analysis in as little as 5 minutes. Such instruments improve analysis speed, but sacrifice sample capacity, detection levels, and flexibility.

A third category includes valved, micro gas chromatograph systems that are fast, but that have operating limits that can restrict its flexibility and use by the user. Refinery gases can be analyzed in such systems in as little as 160 seconds, but the instrument's operating parameters cannot be modified to accommodate changes in sample matrices. For example, there is no capillary inlet splitter so the sample size cannot be changed. Also, the columns that are used are of very small bore, consequently sample capacity is limited. As a result, column overload and limited detection levels are typical. The types of detectors that are available for such instruments are very limited, thus, lack of flexibility is an issue. Service on such an instrument typically cannot be performed in the field because of the exotic nature of the device. Reliability, down time, and maintenance costs are also significant issues. Further, liquefied gas samples, before being analyzed, require special treatment. Any liquid phase sample that is injected into such an instrument can cause damage and result in expensive repairs. Further, such an instrument typically requires four separate channels to complete an analysis. This makes calibration and report generation complex. U.S. Pat. No. 4,470,832 teaches carrier gas switching in a gas chromatograph and U.S. Pat. No. 5,340,543 teaches a module gas chromatograph device both of which are incorporated herein by reference. Also, see "A New Approach to Petroleum Gas Analysis By Multidimensional Gas Chromatography by Naizhong ZOU of the Department of Chemical Engineering at Penn State University, which is also incorporated herein by reference.

Therefore, there is a need in the art for gas chromatograph systems that can analyze chemical and petroleum feed and product streams in substantially less time than presently available without the disadvantages of the current state of the art.

SUMMARY OF THE INVENTION

In accordance with the present invention, there is provided a modular auxiliary oven assembly for use with a gas chromatograph, which oven assembly is comprised of a first housing having at least one inlet fluidly connected to at least one outlet, which housing has contained therein:

a) an oven which is enclosed in a second housing and containing at least one inlet that is fluidly connected to at least one inlet of the housing and at least one outlet that is fluidly connected to at least one outlet of the housing, which oven has contained therein;

i) one or more multiport chromatographic sampling valves having inlet ports and outlet ports wherein said sampling valve is capable of receiving a fluid sample in an inlet port and directing it to an outlet port, and wherein one of its inlet ports is fluidly connected to an inlet of said housing;

ii) one or more fixed volume sampling means that is either an integral part of each one or more sampling valve or is external to the sampling valve;

iii) one or more chromatograph column or column trains capable of separating chemical components of a chemical sample wherein each column has a first end and a second end, wherein its first end is fluidly connected to an outlet port of a chromatographic sampling valve and its second end is fluidly connected to the outlet of said first enclosed compartment; and iv) at least one heater; and b) an actuating mechanism associated with each sampling valve for switching the sampling valve position for directing the flow of fluid through the sampling valve.

In a preferred embodiment there is provided within said auxiliary oven at least one gas switching valve for switching the analytes from two or more columns to a common detector.

In another preferred embodiment there is provided a series of two or more chromatograph column or column trains.

In yet another preferred embodiment of the present invention the oven assembly is integrated with a gas chromatograph by fluidly connecting the outlet of the housing of the oven assembly to the inlet of a detector of the gas chromatograph.

In still another preferred embodiment of the present invention at least one of the chromatographic columns of the oven compartment is a column having a geometry selected to maximize the carrier gas linear velocity and sample capacity without overwhelming the column or detector.

BRIEF DESCRIPTION OF THE FIGURE

The sole FIGURE hereof is a schematic representation of a modular auxiliary oven of the present invention showing a single sampling valve, and a single column in an oven enclosed in a housing. Multiple sampling valves and column or column trains may also be contained in the auxiliary oven.

DESCRIPTION OF THE PREFERRED EMBODIMENTS

Chemical streams that are analyzed by the practice of the present invention include those chemical streams that are typically analyzed by use of valved gas chromatography. Preferred chemical streams include those found in chemical plants and petroleum refineries. As previously mentioned, results from gas chromatography analysis are often critical in chemical process plants and petroleum refineries. Non-limiting examples of preferred chemical streams that can be analyzed in accordance with the present invention include the overhead stream from an atmospheric distillation unit, fuel gas streams, recycle gas streams, overhead streams from a fluid catalytic cracking process unit, flue gas streams, and desulphurizer off gas streams. Chemical components that are typically measured in such streams include $C_1$ to $C_8$ hydrocarbons, hydrogen, helium, oxygen, nitrogen, carbon monoxide, carbon dioxide, hydrogen sulfide, sulfur dioxide, and carbonyl sulfide.

FIG. 1 hereof is schematic representation of the main features of a modular auxiliary oven assembly of the present invention. A housing 10 that completely encloses an oven compartment 12 that itself is completely enclosed on all sides. The housing can be of any suitable material, preferably a metallic material that can withstand the temperatures of the oven contained therein. It is preferred that the housing be comprised of aluminum of suitable thickness. Housing 10 contains inlet port and line 14 and outlet port and line 15 for passing a flowing chemical sample to be analyzed into and out of oven compartment 12 and through a chromatography sampling valve 16 and through a fixed volume sampling means (line or loop) 18 which may or may not be an integral part of the sampling valve. By integral part I mean the sampling means is located within the sampling valve and not just connected external to it. In operation, a chemical sample stream to be analyzed flows through the chromatography sampling valve's inlet (a) and then passes through the fixed volume sample loop as it proceeds to the outlet (b) of the valve before it exits the system through the sample outlet line. The chemical sample is used to purge the fixed volume sample loop for an effective period of time. That is, at least that minimum amount of time needed to purge and displace the sample loop of contaminants before the valve is switched or actuated to inject the sample. When the valve is actuated the sample loop is disconnected from the sample inlet and outlet ports (a and b) of the valve and connected in turn to the carrier gas inlet port (e) and the column inlet port (d). The carrier gas stream, which flows into the oven via line 19 is continuously flowing through the sampling valve and one or more chromatograph columns or column trains, then sweeps the fixed volume sample into it from the sample loop and into the column.

The chromatography sampling valve 16 can be any multi-position (port) valve suitable for gas chromatograph purposes. Inlet and outlet ports are labeled a through f. Diaphragm type valves are preferred, such as those available from Valco Instruments Co. Inc. The diaphragm of these valves is commonly comprised of a polyimide. Also, gas chromatography is well known and is described in Basic Gas Chromatography (Techniques in Analytical Chemistry), by Harold M. McNeil and James M. Miller, Wiley-Interscience, First Edition, 1997, which is incorporated herein by reference. Also, more than one, preferably three sampling valves can be contained in the auxiliary oven. If two or more sampling valves are used it is preferred that they be fluidly connected in series and not parallel so that one sample inlet port 14 and one sample outlet port 15 can be used for all two or more sampling valves.

Returning to the FIGURE, the inlet port(s) of the housing and the inlet of the oven compartment are fluidly connected by way of a suitable conduits 20, such as the appropriate size stainless steel tubing so that a chemical sample can be passed to an inlet port of the multi-port sampling valve 16. An outlet port of the chromatograph multi-port sampling valve is fluidly connected via a suitable transfer line 22 to the inlet of a chromatograph column or column train 24. By column train is meant that two or more columns are fluidly connected in series so that a chemical sample to be analyzed serially passes through two or more columns before being sent to a detector. It is preferred that there be two or more chromatograph columns and/or column trains that can be operated in parallel mode as opposed to being connected in series. If a parallel column configuration is employed a different carrier gas can flow through each column or column train so that each column or column train can be used simultaneously to analyze for different chemical components of a chemical sample. Even if different carrier gases are used in each column, a common detector can be used in the practice of the present invention by use of a suitable switching valve (not shown). Also two or more parallel column trains will allow one to switch from one to the other with respect to a common detector, For example, if one column or column train having a carrier gas flowing there through, is used to analyze for a chemical component(s) that moves through the column very quickly the detector can be switched to the other column or column train having a different carrier gas, and detect chemical components that move through a chromatograph column relatively slowly.

The chromatograph columns used in the practice of the present invention can be any suitable column used to analyze the chemical sample. It is preferred that the chromatograph column used in the auxiliary oven have an inside diameter less than or equal to 0.050 inch. Non-limiting examples of such columns include micro-packed columns and capillary columns. Micro-packed columns are typically those columns that use $\frac{1}{16}$" inch OD×0.050-inch ID or smaller stainless steel tubing. The column is packed with a material suitable for the separation of sample to be analyzed.

The inside diameter of such capillary tubing will range from about 0.10 to 0.53 mm. A capillary column will typically be comprised of two major parts—tubing and stationary phase. A thin film (0.1–10.0 $\mu$m) of a relatively high molecular weight, thermally stable polymer is coated onto the inner wall of small diameter (0.05–0.53 mm I.D.) tubing. This polymer coating constitutes the stationary phase. The most common stationary phases of this type are the polysiloxanes and polyethylene glycols. The next most common type of stationary phases are small, porous particles composed of polymers or zeolites (e.g. alumina, molecular sieves). Fused silica tubing typically contains a protective coating applied to the outer surface with polyimide coating. The upper temperature limit of standard polyimide coated fused silica tubing is about 360° C. High temperature polyimide coated tubing has an upper limit of about 400° C. The inner surface of fused silica tubing is chemically treated to minimize interactions of the sample with the tubing. The reagents and process used depend on the type of stationary phase coated onto the tubing. A silylation process is used for most columns. Silanol groups (Si—OH) on the tubing surface are reacted with a silane type of reagent. Typically, a methyl or phenyl-methyl silyl surface is created for most columns. The selection of the stationary phase is well known in the art and a detailed discussion of the appropriate stationary phase for any particular sample is not necessary for a discussion of this invention. A carrier gas flows through the tubing and is conventionally called the mobile phase. The column is more preferably packed with a material suited to accomplish the separations required and will be operated at flow rates and temperatures such that optimum resolution and an analysis speed of less than 300 seconds is attained.

The oven compartment will contain a heater 26 that is preferably controlled by a controller external to housing 10. The heater is used to maintain oven compartment 12 at the desired temperature for the sample to be analyzed so that adequate separation of chemical components occurs in the one or more column or column trains. Also contained within housing 10, but not contained in oven compartment 12 is a sampling valve actuator 28 of any suitable type. It is preferred that actuator 28 be comprised of a solenoid valve and an actuator mechanism. The preferred diaphragm valves typically integrate an air driven actuator into the valve body, so provision for an air switching solenoid is all that is necessary. The solenoid turns on and off at the prescribed times to allow pressurized air to flow to the actuator which in turn switches the valve. The outlet of column 24 will be fluidly connected to the outlet 30 of oven compartment 12 which is fluidly connected via line 31 to outlet 32 of housing 10.

It will be understood that the oven may be divided into compartments, each associated with its own heater so that each compartment can be maintained at a different temperature if necessary. For example, there can be a separate compartment enclosing the sampling valves maintained at a temperature A, and a separate compartment enclosing a first column or column train maintained at a temperature B, and a separate compartment enclosing a second column or column train and maintained at a temperature C.

This entire auxiliary oven assembly is a modular unit so that it can be an article of manufacture separate from that of a gas chromatograph mainframe. That is, it can be independently manufactured and sold separate from the main gas chromatograph instrument (mainframe) to instrument manufacturers or to end uses of a gas chromatograph. The module contains all of the valves, actuators, and heaters necessary to perform the analysis as well as the majority of the columns, except the detector or detectors. Columns that may be mounted in the main gas chromatograph oven are connected directly to the gas chromatograph injection port and can be readily serviced and replaced by an operator. When used, the modular oven assembly will be connected to the gas chromatograph instrument by suitable minimal plumbing. For example, the outlet of the column or columns of the auxiliary oven will be connected via heated stainless steel tubing to the inlet of a detector port on the gas chromatograph. In other words, the auxiliary oven of the present invention can be used on any conventional gas chromatograph unit, or platform.

The modular approach allows for easy change-out of malfunctioning units. Conventional approaches integrate the valves and columns into the gas chromatograph itself, so isolating a defective component requires highly trained and experienced personnel to be on site. The use of the presently claimed modular oven assembly allows an operator to exchange the entire column train, including valves, solenoids and heaters at once with minimal training. The use of the auxiliary oven assembly also enables a chemical mixture sample to be analyzed at substantially shorter time than gas chromatograph units that do not contain the auxiliary oven of the present invention. For example, the fastest conventional valved gas chromatographs presently available for analyzing samples from chemical and petroleum refineries still require about 15 minutes for each test sample. Use of the presently claimed invention allows one to analyze the same test sample in 300 seconds or less, preferably in 200 seconds or less, and more preferably in 100 seconds or less. Some gas chromatograph systems do not require the use of valves, but valves are needed for the gas chromatograph system of the present invention to introduce the chemical test sample into the system and/or to control the flow of sample into the chromatograph column.

The gas chromatograph apparatus, containing the auxiliary oven of the present invention includes the following benefits when compared with conventional gas chromatograph systems not containing the auxiliary oven of this invention:

(i) The use of valves that switch at high speeds allows relatively high flow rates without loss of control of column backflush timing, column bypass timing, and detector carrier gas switching.

(ii) The use of thermal conductivity detector carrier gas switching allows for a simpler system than current state of the art, and a much less expensive system than state of the art.

(iii) Column flow rates and temperatures are controlled to bring about the separation of solutes from the chemical mixture in as little as 100 seconds. This is a fraction of the time of conventional valved gas chromatographic systems that require 15 minutes to 65 minutes to complete.

(iv) Less man-hours are required to assemble since conventional approaches to manufacturing refinery gas analyzers require the mounting of valves, columns, actuators, solenoids, and fittings wherever they will fit in the gas chromatograph mainframe. This requires a relatively large number of man-hours to fit and assemble the instrument. With the instant modular approach, system components are assembled in an efficient manner, in a single module unit instead of in multiple locations in the gas chromatograph mainframe. This substantially reduces the number of man-hours required for assembly.

(v) Pre-assembly of the modules further reduces cost of manufacturing. Conventional approaches require the purchase of the gas chromatograph mainframe in advance in order to build the analyzer. The capital required to maintain an inventory of gas chromatograph mainframes is a significant issue. This use of the modular oven assemblies of the present invention allows a single gas chromatograph to be used to pre-test multiple modular oven assemblies. In other words, the capital that would have been required to purchase multiple gas chromatograph mainframes can be saved.

(vi) The modular approach of the present invention allows for easy replacement of malfunctioning units. Conventional approaches integrate the valves and columns into the gas chromatograph itself, so isolating a defective component requires highly trained and experienced personnel on site. Qualified personnel are very hard to find in this field so labor cost is high and personnel are typically spread very thin. Support suffers tremendously as a result. This modular approach allows an operator to exchange the entire column train, valves, solenoids, and heaters at once with minimal training. Malfunctioning units can be easily shipped to a central repair facility where procedures for refurbishing units can be routinized and cost minimized for the manufacturer as well as the end user.

A sample to be analyzed is introduced to an injection port (inlet port) usually with use of a syringe or an exterior sampling device. The injector is usually heated to a temperature sufficient to vaporize the sample. The resulting vaporized solutes are transported by a carrier gas into a chromatograph column or column trains that contain a stationary phase capable of separating chemical components (solutes) from the chemical sample stream. The column is maintained in a temperature-controlled oven 12. The various solutes travel through the column at different rates primarily determined by their physical properties, and the temperature and composition of the column. The fastest moving solutes exit (elute) the column first then followed by the remaining solutes in corresponding order. As each solute elutes from the column, it enters a heated detector. An electronic response is generated upon interaction of the solute with the detector. The magnitude of the response is recorded by a data system and is plotted against elapsed time to produce a chromatogram.

The auxiliary oven of the present invention can also be used in combination with the primary oven of the gas chromatograph mainframe. The auxiliary oven, that will preferably be operated in isothermal mode, will be integrated with the basic gas chromatograph system that will receive all or part of the sample for analysis. It is preferred that the auxiliary oven be situated at the top or side of the basic gas chromatograph integral oven unit.

As solutes elute from the column, they interact with the detector. The detector converts this interaction into an electronic response that is sent to the data system. The magnitude of the response is plotted versus time (from the time of injection) and a chromatogram is generated. Some detectors respond to any solute eluting from the column while others respond only to solutes with specific structures, functional groups or atoms. Non-limiting types of detectors include: flame ionization detectors, thermionic detectors, atomic emission detectors, nitrogen phosphorous detectors, electron capture detectors, thermal conductivity detectors, flame photometric detectors, photo ionization detectors, electrolytic conductivity detectors, and mass spectrometers. All of these detectors are well known in the art and a discussion of each is within the knowledge of those having at least ordinary skill in the art. The selection of a particular type of detector for any particular type of chemical components to be detected is also well known in the art and will not be discussed in detail herein.

In a preferred embodiment of the present invention a refinery or chemical sample is analyzed in a three sub-system apparatus wherein each sub-system operates simultaneously to provide an extremely fast reliable system. The sample stream will be comprised of: a) at least one chemical component selected from the $C_1$ to $C_6$ hydrocarbons; b) hydrogen; and c) at least one component selected from oxygen, nitrogen, carbon dioxide, and carbon monoxide. In other words, three separate columns or column trains are used substantially simultaneously to perform three different chemical analysis using two or more different carrier gases. The entire analysis is performed in a system that comprises an auxiliary oven assembly of the present invention and a mainframe gas chromatograph.

The auxiliary oven assembly will be comprised of three multi-port sampling valves, two columns or columns trains in parallel, a switching valve for switching the outlet from two column or column trains to a common detector of the mainframe gas chromatograph. Of course, the output of each column can also be directed to a separate detector of the main gas chromatograph instead of to a common detector. The auxiliary oven will also contain at least one heater, and a fixed volume sample loop associated with each sampling valve and an actuator associated with each sampling valve. The mainframe gas chromatograph will contain a capillary injection port, two detectors, an oven, and a column capable of separating $C_1$ to $C_6$ hydrocarbons from the injected sample.

Conventional chromatography practices hold that there are specific limitations on the range of operable column flow rates and oven temperatures for a given column and or sample matrix. This accepted range of operable flow rates and column temperatures are very narrow. Conventional practice also dictates that identifying the ideal set of conditions for each pair of solutes in a sample would be excessively time consuming and produce negligible improvements in speed and/or resolution. For example, it is stated in Electronic Pressure Control in Gas Chromatography, Sally S. Stafford, Editor, Hewlett-Packard Company, 1993, Part No. 5182-0842, on page 8:

"Pressure was correctly recognized as a secondary control variable, which was a disappointment to those looking for primary control variables that could extend the rather limited range of retention adjustment available with the stationary phases of the day. Perhaps equally important was the fact that pressure or flow programming was limited and expensive."

And on page 6, of the above reference:

"Increasing the flow rate much above the optimum value means that the analysis time drops, but it usually also means that the quality of the separation becomes poorer."

Optimum value typically means the operating range suggested by the manufacturer of the column. Applicant has unexpectedly found that he can operate the columns, particularly capillary and micro-packed, at least two times, preferably at least three times the suggested rate and obtain an analysis at unexpected short times with expectedly good resolution of the resulting analytes. Also, while conventional wisdom teaches that the manufacturers recommendation of say 10 ml/min flow rate should be maintained it has been found by the inventor hereof that flow rates as high as 30 to 50 ml/min can be obtained without significant loss of resolution.

The method of the present invention is novel and demonstrates an optimum set of parameters far outside those that were shown in the art prior to this invention and as a result it demonstrates a significant improvement in the analysis speed over prior art.

The first sub-system utilizes a six-port diaphragm gas sampling stainless steel valve mounted in the modular auxiliary oven assembly with helium as the carrier gas, although hydrogen can also be used. The sampling valves used herein are used in association with a fixed volume sample loop. The main gas chromatograph unit contains an electronic pressure controlled split capillary inlet capable of programmed rates of 100 psi per minute and a maximum pressure of 100 psi. The split capillary inlet allows for only a portion of the sample to move through the chromatograph column, with the remaining, or excess portion being vented. Split injection is preferred for capillary columns. The sample is injected, vaporized and mixed with the carrier gas. A fraction of the sample-gas mixture flows onto the column, the remainder is vented to the atmosphere. The ratio of sample delivered onto the column to that going to vent is controlled by a suitable means, such as an adjustable needle valve.

This first sub-system will also contain, in the mainframe gas chromatograph, a flame ionization detector; a temperature programmable primary oven capable of a programmed heating rate of at least 40° C. per minute, and contained in said primary oven a 15 meter×0.25 mm alumina, "S " deactivated, porous layer open tubular capillary chromatograph column suitable for the separation of $C_1$ to $C_6$ hydrocarbons. Any stationary phase suitable for the effective separation of $C_1$ to $C_6$ hydrocarbons can be used. The analysis performed by this first sub-system is for $C_1$ through $C_6$ hydrocarbons using a suitable detector, preferably a flame ionization detector. Flame ionization detectors are well known in the art and they typically consists of a stainless steel burner assembly installed in the detector compartment and an electromotive system in a separate unit adjacent to the gas chromatograph. It is sometimes installed tandem to a thermal conductivity detector. Capillary columns are preferred for the practice of the present invention because of their high efficiency. Primary oven temperature program rates, column flow rates, and inlet split ratio will be optimized for the best resolution and sensitivity according to the following process:

1. Set:
   a) the initial inlet pressures,
   b) split vent flow rate, and
   c) final pressure to the appropriate initial values, such that good resolution between analyte peaks and adequate analyte peak size for the detector can be obtained. (A good place to start is with the column manufacturers recommendations);

2. Set:
   a) the oven temperature to an appropriate initial temperature to maintain the sample in the vapor phase,
   b) the temperature program rate of the column to result in descrete analyte bands, typically at least about 10° C. per minute, and
   c) the final temperature of the column, which final temperature will be a temperature less than that that will cause degradation of the stationary phase of the column. (Again a good place to start is with the column manufacturers recommendations);

3. Purge the sample to analyzed through the gas-sampling valve that is located in the auxiliary oven and then switch the valve to sweep the sample with a carrier gas into a heated transfer line constructed of suitable tubing material where it is carried into the capillary inlet of the gas chromatograph mainframe. The sample is then conducted onto the column and a suitable detector in the mainframe gas chromatograph for analysis;

4. After analysis is complete, determine the quality of the $C_1$ to $C_6$ separations and detection levels and identify groups of peaks that could be better resolved, and those that have the broadest resolution;

5. Make adjustments to analyte retention times, resolution, and sensitivity by alternately adjusting oven temperature and column flow/pressure programming rates; and 6. Systematically test each of the parameters and identify the influence that each has on a particular pair of solutes and on the total analysis. Make the necessary adjustments so that the combination of analysis time, resolution, and sensitivity is established that results in a complete analysis within 300 seconds or less, preferably 200 seconds or less, and more preferably 100 seconds or less.

The procedure used for the second sub-system is as follow:

The second sub-system is used for the analysis of hydrogen and is performed within the auxiliary oven assembly except for the detector that is located within the gas chromatograph mainframe. This second sub-system is comprised of a multi-port diaphragm gas-sampling valve configured for injection/backflush to vent, with a nitrogen carrier, and $\frac{1}{16}^{th}$ inch micro-packed columns suitable for the separation of hydrogen from the balance of the sample; and a thermal conductivity detector that is located in the mainframe gas chromatograph. Oven temperature, sample size, column length, column ID, and column flow rate is adjusted to elute the hydrogen peak as soon as possible without losing resolution between the hydrogen and balance peaks (everything in sample but hydrogen) or overwhelming the detector. Thermal conductivity detectors electronically measure the changes in the thermal conductivity of the gas due to the presence of the analyte. Nitrogen is used as the carrier gas.

Helium, hydrogen, or nitrogen are typically used as the carrier gas since they have high thermal conductivity and they therefore show the presence of other components of the gas because of the change in thermal conductivity.

The procedure used for the third sub-system is as follows:

The components of the third sub-system are contained within the auxiliary oven except for the detector. This third sub-system is comprised of a multi-port diaphragm gas sampling and backflush valve; an associated $\frac{1}{16}^{th}$ inch micro-packed column suited for the separation of methane, $CO_2$, ethane, ethylene, and; a multi-port sampling valve configured for injection/backflush to vent, and an associated $\frac{1}{16}^{th}$ inch micro-packed column suitable for the separation of $O_2$, $N_2$, methane, and CO. Helium or hydrogen can be used as a carrier gas, and a thermal conductivity detector is used which is located in the gas chromatograph mainframe. Oven temperature, sample size, column length, column ID, and column flow rate are adjusted to fully resolve the desired peaks in 300 seconds or less without overloading the column or the detector. The two columns are in series wherein air and methane pass through first and are retained in a sample loop until $CO_2$, ethane, and ethylene are passed through. The stored air methane sample is then passed to the detector and measured. Similar sampling valve and column arrangements are shown in "The Analysis of Gases by Chromatography" Pergamon Series in Analytical Chemistry, Volume 7, 1993 and edited by R. Belchert et al.

Situated between the second and third subsystem and the single thermal conductivity detector is a ten-port diaphragm valve configured to allow alternate selection of the two separate column trains and their associated carrier gas/reference gas streams. Each of the separate carrier gas streams and their associated reference gas streams are allowed to flow continuously with no interruption and minimized dead volume. Switching speed between the two streams is enhanced by the selection of narrow bore columns and the high carrier gas flow rates associated with the methods described here. This allows one to use a common detector for two or more columns or column trains having two or more different carrier gases flowing there-through. For example, in this preferred embodiment, three analysis are being performed substantially simultaneously. The first sub-system performs the $C_1$ to $C_6$ hydrocarbon analysis using the oven and column of the gas chromatograph mainframe wherein a sampling valve of the auxiliary oven assembly is used for the initial injection of the sample and routing it to the gas chromatograph mainframe.

The second sub-system is used to analyze for hydrogen with the auxiliary oven being primarily used for component separation within the column so that the elution of the component(s) from the column is sent to the thermal conductivity detector of the gas chromatograph mainframe for analysis recordation. Nitrogen is used as the carrier gas in this second sub-system.

The third sub-system is used to analyze methane, carbon dioxide, ethane, ethylene, oxygen, and/or nitrogen. Again, the components in the auxiliary oven are used except for the detector. Hydrogen or helium is used as the carrier gas in this third sub-system. Both the second and third sub-systems share a common thermal conductivity detector located in the main gas chromatograph unit. Hydrogen, with nitrogen as the carrier gas, will elute very quickly through the second sub-system which will allow one to quickly switch to the third sub-system that has hydrogen or helium as the carrier gas. The same thermal conductivity detector used in the second sub-system can be used for the analysis of this third sub-system. This is unique in the art and is partially responsible for allowing one to conduct a refinery gas analysis using only two detectors instead of three.

What is claimed is:

1. A stand alone modular oven assembly fluidly connectable to a gas chromatograph, which oven assembly consisting essentially of a first housing having at least one inlet fluidly connected to at least one outlet, which first housing encloses:
   a) a second housing defining an oven compartment comprising at least one inlet that is fluidly connected to at least one inlet of said first housing and at least one outlet that is fluidly connected to at least one outlet of said first housing, which oven further comprising:
      i) a multiport chromatograph sampling valve having inlet ports and outlet polls wherein said sampling valve is capable of receiving a fluid sample in an inlet port and directing it to an outlet port, and wherein one of the inlet ports of said sampling valve is fluidly connected to an inlet port of said second housing;
      ii) a fixed volume sampling loop that is either an integral part of or is external to the sampling valve;
      iii) a chromatograph column capable of separating a chemical component selected from the group consisting of $C_1$ to $C_8$ hydrocarbons, hydrogen, helium, oxygen, nitrogen, carbon monoxide, carbon dioxide, hydrogen sulfide, sulfur dioxide, and carbonyl sulfide of a chemical sample containing one of more of said chemical components wherein said column has a first end and a second end, wherein said first end is fluidly connected to an outlet port of said chromatographic sampling valve and said second end is fluidly connected to the outlet of said second housing; and
      iii) an electric heater; and
   b) a valve actuator for operating said sampling valve.

2. The modular oven assembly of claim 1 wherein the column is a capillary column.

3. The modular oven assembly of claim 1 which is integrated with a valved gas chromatograph by fluidly connecting the outlet of the housing of the oven assembly to the inlet of a detector of the gas chromatograph.

4. The modular oven assembly of claim 1 wherein the chromatographic column has a geometry selected to maximize the carrier gas linear velocity and sample capacity without overwhelming the column or detector.

5. The modular oven assembly of claim 3 wherein the gas chromatograph contains both a flame ionization detector and a thermal conductivity detector.

* * * * *